United States Patent [19]

Satoh et al.

[11] Patent Number: 4,870,570
[45] Date of Patent: Sep. 26, 1989

[54] CONTROL SYSTEM FOR MULTI-PROCESSOR

[75] Inventors: Masaharu Satoh; Sadakatsu Hashimoto, both of Nara, Japan

[73] Assignee: Sharp Kabushiki Kaisha, Osaka, Japan

[21] Appl. No.: 480,064

[22] Filed: Mar. 29, 1983

[30] Foreign Application Priority Data

Jan. 24, 1983 [JP] Japan ............................. 58-10185

[51] Int. Cl.⁴ ............................................. G06F 15/16
[52] U.S. Cl. ................................................. 364/200
[58] Field of Search ..................................... 364/200

[56] References Cited

U.S. PATENT DOCUMENTS 3,517,171  6/1970  Avizienis ........................... 364/200
4,162,526  7/1979  Gass et al. ......................... 364/200
4,204,429  5/1980  Dye et al. .......................... 364/200
4,422,142  12/1983 Inaza et al. ........................ 364/200

Primary Examiner—David L. Clark
Attorney, Agent, or Firm—Birch, Stewart, Kolasch & Birch

[57] ABSTRACT

A control system for a multi-processor system including a plurality of processors comprises a controlling processor and a controlled processor. The controlling processor consumes little power and provides low-speed operation. The controlling processor is continuously powered. The controlled processor consumes a greater amount of power and provides high-speed operation. The controlled processor is normally disconnected from a power source. The controlling processor selects the energization of the controlled processor.

3 Claims, 3 Drawing Sheets

CONTROL SYSTEM FOR MULTI-PROCESSOR

BACKGROUND OF THE INVENTION

The present invention relates to a control system for a multi-processor including a plurality of microprocessors.

Recently, superior processors have been invented to improve the properties of personal computers. Such superior personal computers generally include a 16-bit CPU constructed with many N-channel MOS FETs. To drive such 16-bit CPUs, a current of about several hundreds mA at a voltage of about 5 V is required. However, no limitation of power consumed is present since the personal computers are operated with commercial power sources.

On the contrary, some limitation of power consumed is present in portable or handheld computers driven with power batteries. Therefore, they should be equipped with C-MOS processors which consume little power.

However, conventionally, the C-MOS processors which consume little power cannot provide high-speed operations or other desirable characteristics.

Therefore, it is desirable to construct a system having the two features of consuming little power and providing high-speed operation in portable computers.

SUMMARY OF THE INVENTION

Accordingly, it is an object of the present invention to provide an improved portable computer which consumes little power and provides superior features.

It is another object of the present invention to provide an improved control system for a multi-processor system comprising a plurality of central processing units(CPUs), the CPUs functioning as an operation unit and a control logic circuit.

Briefly described, in accordance with the present invention, a control system is provided for controlling a multi-processor containing a plurality of microprocessors functioning as an operation unit and a control logic circuit. The plurality of processors including a controlling processor which consumes little power and provides low-speed operation, and a controlled processor which demonstrates superior features but consumes great power. The controlling processor is continuously operated and the controlled processor is normally inoperative, since it is normally disconnected from the power source. The controlling processor controls the energization of the controlled processor.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
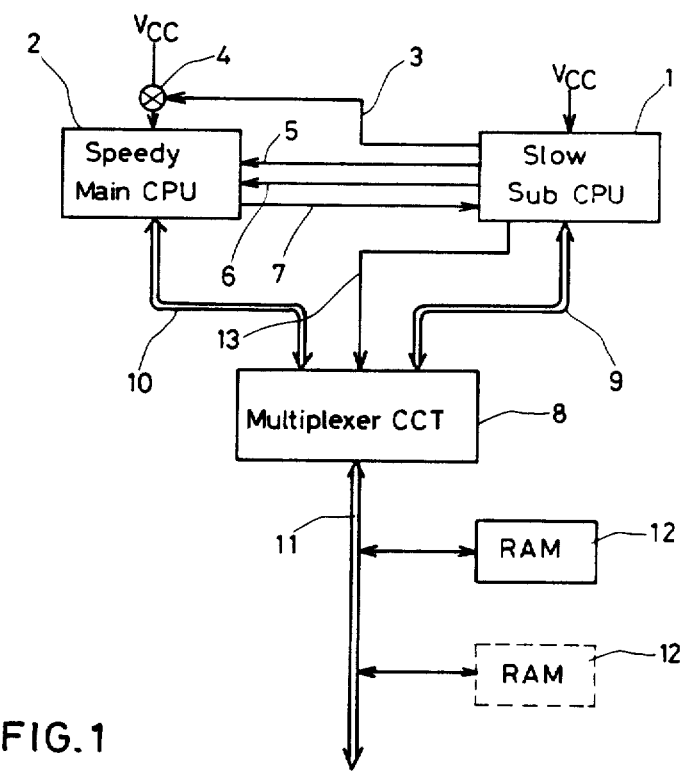
FIG. 1 shows a block diagram of a control system of a multi-processor according to the present invention.

FIG. 1 shows a block diagram of a control system for a multi-processor comprising a plurality of processors functioning as an operation unit and control logic. The control system of FIG. 1 mainly comprises a C-MOS type processor 1, an N-channel MOS type processor 2, a multiplexer circuit 8 and system memories (RAMs) 12. Among these circuits, various signal lines are connected including an ON-OFF signal line 3, a reset signal line 5, a hold signal line 6, an interrupt signal line 7, two local buses 9 and 10, a system bus 11, and a bus-right control signal line 13. A power switch 4 is selectively connected by the ON-OFF signal line 3.

The C-MOS type processor 1 which consumes little power continuously receives power energy from a first power source VCC, and operates as a sub CPU and a controlling processor. This processor 1 is continuously operated to function as a low-speed processing unit.

The N-channel MOS type processor 2 operates as a main CPU and a controlled processor, and functions as a high-speed processing unit. The application of power to; after "2" insert —from a second power source $V_{cc}$ main CPU 2 from a second power source $V_{cc}$ is normally inhibited by the power switch 4. To operate this main CPU 2, the power switch 4 is actuated by receiving a power supply ON signal of a high level "1" on the ON-OFF signal line 3 from the sub CPU 1.

The multiplexer circuit 8 is provided for controlling the signals to be carried on the communication lines. To this multiplexer circuit 8, there are connected the first local bus 9 specific to the sub CPU 1, the second local bus 10 specific to the main CPU 2 and the system bus 11 connected to the RAMs 12. The system bus 11 can function for the sub CPU 1 and the main CPU 2. Signals to be carried on the bus-right control signal line 13 determine whether the system bus 11 carries signals for either the main CPU 1 or the sub CPU 2.

To enable high-speed operation of the system of FIG. 1, the sub CPU 2 develops ON signals of a high level "1" on the ON-OFF line 3 to make the power switch 4 conductive, so that the main CPU 1 is powered with the second power source of VCC. The sub CPU 1 develops high level signals "1" on the bus-right control signal line 13, so that the multiplexer circuit 8 enables the system bus 11 to function for the main CPU 2.

When the main CPU 2 detects that no high-speed operation is necessary, the main CPU 2 enables some information to be retained or sheltered to be stored into the a specific location (mailbox) in one of the RAMs 12. Said some information is to be forwarded to the sub CPU 1. At the same time, the main CPU 2 develops interrupt signals in the high level of "1" on the line 7 to interrupt the sub CPU 1. Responsive to this operation, the sub CPU 1 develops hold signals of "1" on the line 6 to stop the operation of the main CPU 2. Further, the sub CPU 1 generates low level signals of "0" on the bus-right control signal line 13, so that the multiplexer circuit 8 enables the system bus 11 to function for the sub CPU 1. The sub CPU 1 reads in the information stored in the mailbox in one of the RAMs 12 to decode it. When the decoded information provides a command of "the power of the main CPU 2 should be switched off", the sub CPU 1 generates low level signals of "0" on the line 3 to turn off the main CPU 2. Thereafter, the sub CPU 1 performs necessary tasks directed from the main CPU 2 in place of this CPU 2.

The switching from the low-speed operation to the high-speed operation is performed depending on the instruction contents of the mailbox. For example, it is assumed that the instruction contents of the mailbox means a command of "when a specific key input is present, the main CPU 2 should be turned on and the bus right should be provided to the main CPU 2". When the sub CPU 1 reads in such a key input, it provides the high level signals of "1" on the lines 3, 5 and 13 to start the main CPU 2, so that the high-speed operation is selected.

Thus, during the low-speed operation, the high-speed main CPU 2 is not powered. It is powered and operated only when needed. Low-power consumption and high-speed operation are therefore both provided.

Figure 2:
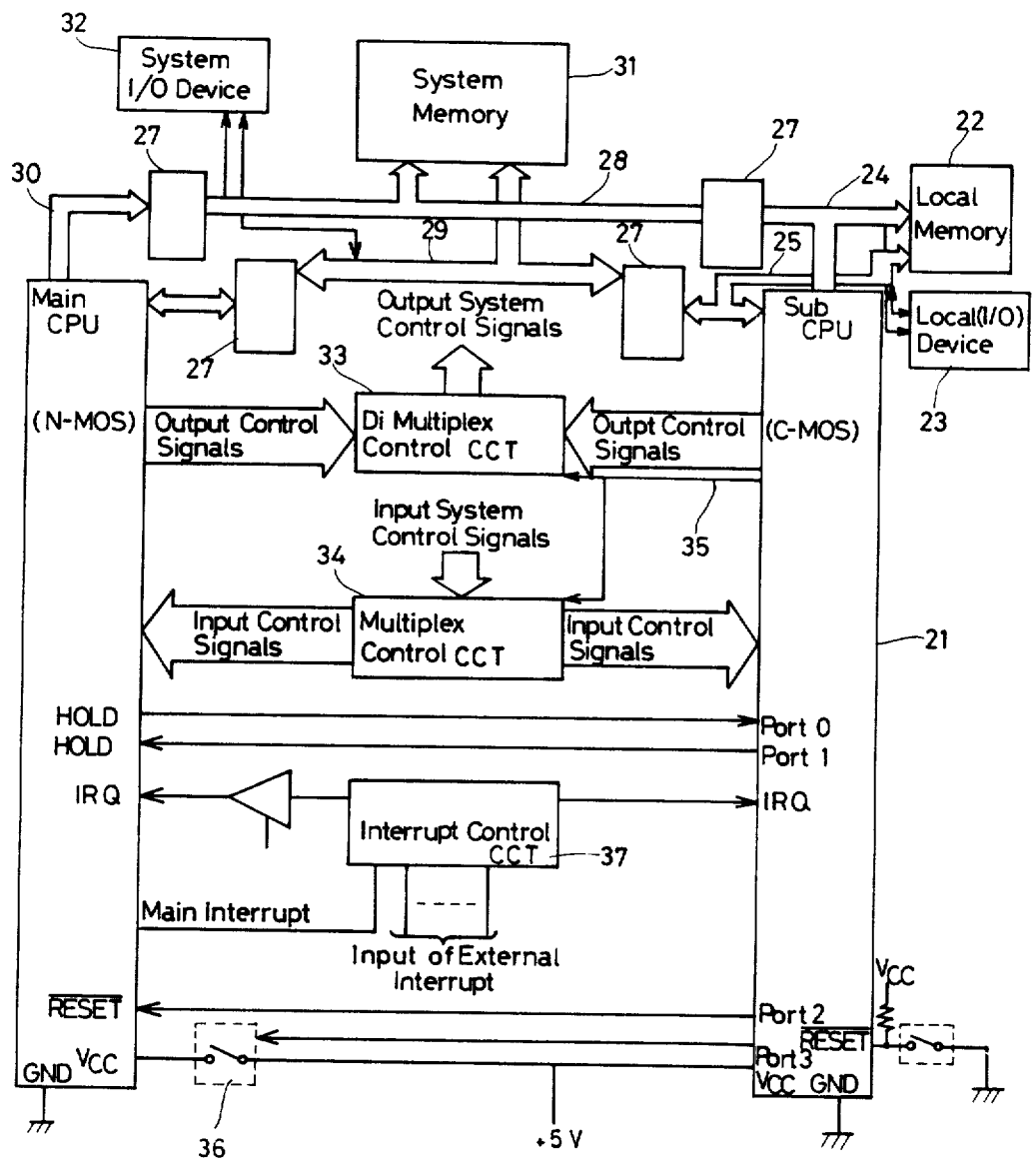
FIG. 2 shows a circuit configuration of the control system of FIG. 1.

FIG. 2 shows a more-detailed circuit construction of the system of FIG. 1.

In FIG. 2, a sub CPU of the C-MOS type is designated by 21 and is of the low-speed type as is the sub CPU 1 of FIG. 1. This sub CPU 21 has a plurality of input/output ports. To this sub CPU 21, a local memory 22 and a local I/O device 23 are connected via a local address bus 24, and a local data bus 25. The local I/O device 23 may be a printer, a cassette recorder and the like, so that the device 23 can operate for a long time. The sub CPU 21 can operate being independent from the operation of the main CPU 26. is of a main CPU 26 is of N-channel MOS type and the high-speed type as is the main CPU 2 in FIG. 1. This main CPU 26 is, for example, a 16-bit CPU. A plurality of buffers 27 are selected to connect either of the CPUs 21 and 26 with a system address bus 28 and a system data bus 29. A main address bus 30 is connected to the main CPU 26. Via these buses and the buffers 27, the CPUs 21 and 26 are connected to a system memory 31 and a system I/O device 32 such as a floppy disk.

A di-miltiplex control circuit 33 is responsive to the CPUs 21 and 26 for selecting one of a read signal and a write signal developed from these CPUs and for supplying the selected signals to the system.

A multiplex control circuit 34 is operated to return a wait signal and an acknowledge signal from the system to the current one of the CPUs 21 and 26. These circuits 33 and 34 are switched in response to a processor switching signal on a line 35 developed from the sub CPU 21.

An interrupt control circuit 34 is for interrupting both of the CPUs 21 and 26. Both CPUs can be interrupted independently.

A port$_0$ in the sub CPU 21 inputs a hold completion signal. A port$_1$ in this CPU 21 outputs the hold control signal. Terminals IRQ in the CPUs 21 and 26 receive interrupt request signals. A port$_2$ in the sub CPU21 outputs a reset control signal. A port$_3$ outputs a power control signal. A power control switch 36 is connected to the main CPU 26.

When the main CPU 26 is not powered, all the lines connected to this CPU 26 bear low-level signals or show high impedance.

Figure 3:
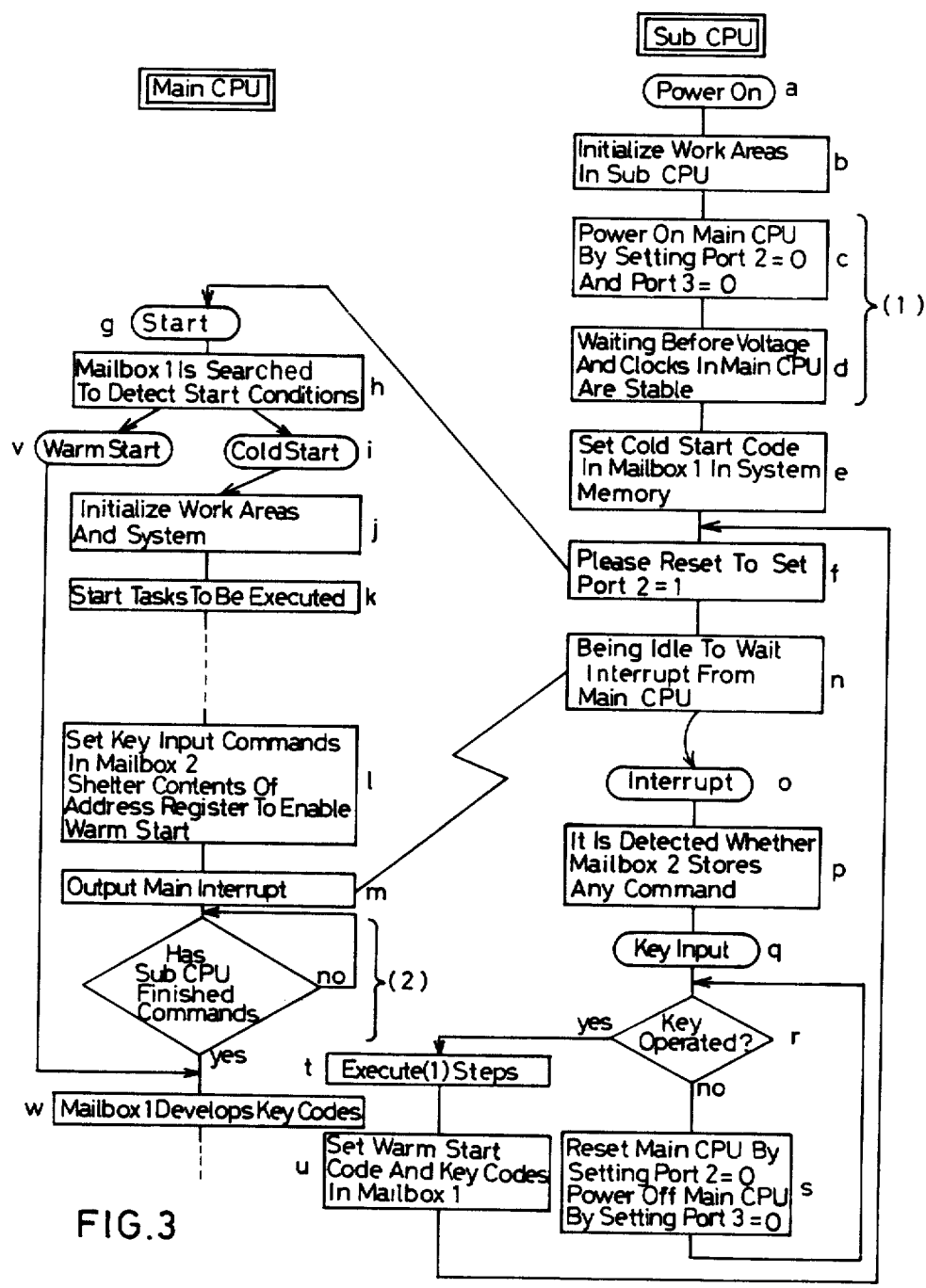
FIG. 3 shows a flow chart of the operation of the control system of the present invention.

FIG. 3 shows a flow chart of the operation of the system of FIG. 2 to which exemplary key inputs are applied.

Step a: Power energy is supplied.

Step b: Work areas and necessary portions of the sub CPU 21 are initialized.

Step c: A condition of the port$_2$=0(low level) and the port$_3$=1(high level) is selected to power the main CPU 26.

Step d: The stable condition of the power energy and the clocks is awaited.

Step e: A code representing a cold start(initial start) is placed in a mailbox$_1$ in the system memory 31.

Step f: The port$_2$=1 is selected to release the reset of the main CPU 26.

Step g: The main CPU 26 starts.

Step h: The instruction contents in the mailbox$_1$ of the system memory 31 are examined to detect a starting command.

Step i: The cold start of the main CPU 26 is enabled in accordance with the=detection of a corresponding starting command.

Step j: The work areas and the necessary portions of the main CPU 26 are initialized.

Step k: Necessary tasks are performed.

Step l: A key input command is set into a mailbox$_2$ of the system memory 31. Necessary conditions for a warm start(re-operation) of the main CPU 26 are sheltered. The necessary conditions concern the address information, the contents of the register means and the like.

Step m: The main CPU 26 generates the interrupt signal to provide to the sub CPU 21.

Step n: At this stage, the sub CPU 21 is made idle to wait the interrupt signal from the main CPU 26.

Step o: In response to the interrupt signal from the main CPU 26, the sub CPU 21 is interrupted.

Step p: The sub CPU 26 determines which commands are included within the contents of the mailbox$_2$ of the system memory 31.

Step q: Since it is assumed that this command is to input key, the key input operations are enabled.

Step r: It is determined whether any of the key switches is actuated.

Step s: While no key input operations are present, the port$_2$=0 is selected to reset the main CPU 26 and the port$_3$=0 is selected to shut off the power to the main CPU 26.

Step t: When some key input operation is present, steps (1) including steps c and d are re-selected in which the main CPU 26 is powered.

Step u: Upon the stabilization of the power energy, a code representing the warm start(re-operation) and the related key code are set into the mailbox$_1$ of the system memory 31.

Step f is re-selected to start the main CPU 26.

Step v: The main CPU 26 is responsive to the contents of the mailbox$_1$ for performing the warm start.

Step w: The main CPU 26 is responsive to the key codes for performing necessary steps.

Thus, the sub CPU 21 is operated to perform low-speed tasks including the monitoring of the key input operations. In such a case, the sub CPU 21 consumes little power while monitoring the key input operations. During this operation, the main CPU 26 which would consume a great power is prevented from being powered. When the key input operations are present, the main CPU 26 is energized to perform the key input instructions.

Steps (2) are necessary to continue to operate the main CPU 26 without selecting steps (1) at the sub CPU 21 side. These steps (2) are selected when it is unnecessary to power off the main CPU 26 because the key input operations are present at the time when main interrupt signals are developed from the main CPU 26 into an interrupt control circuit 37.

It may be possible that, even when the main CPU 26 is not powered, the main CPU 26 is operated by inputting external interrupt signals into the interrupt control circuit 37. Further, the main CPU 26 is operated while the sub CPU 21 performs some tasks.

In this manner, even when the main CPU 26 is prevented from being powered, a high quality system is provided which is similar to the case where the main CPU 26 is continuously powered.

While only certain embodiments of the present invention have been described, it will be apparent to those skilled in the art that various changes and modifications may be made therein without departing from the spirit and scope the present invention as claimed.

What is claimed is:

1. A multi-processor system comprising:
   a power source;
   controlling processor means for implementing low speed operations of said system, said controlling processor means being continuously connected to said power source to receive power therefrom and having a low power consumption and processing speed;
   controlled processor means for implementing high-speed operations of said system, said controlled processor having a higher processing speed and power consumption than said controlling processor means;
   switch means, operatively interposed between said power source and said controlled processor means for controlling the application of power to said controlled processor means;
   said controlling processor means including means for determining a need for high-speed processing and for controlling said switch means in response thereto to apply power to said controlled processor means when high-speed processing is necessary;
   a system buss; and
   buss selection means for selectively connecting said system buss to said controlled processor means or said controlling processor means, said buss selection means connecting said buss to said controlled processor means when said controlled processor means is connected to said power source.

2. The system of claim 1 further comprising mailbox memory means for retaining information including operation instructions to be transferred between said controlled processor means and said controlling processor means.

3. The system of claim 2, further comprising interrupt means for independently interrupting the operation of either of the controlling processor means and the controlled processor means.

* * * * *